(12) United States Patent
Takahashi

(10) Patent No.: US 6,708,813 B2
(45) Date of Patent: Mar. 23, 2004

(54) PRODUCT SORTER WITH TRANSPORT CONVEYOR

(75) Inventor: Atsushi Takahashi, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 10 days.

(21) Appl. No.: 10/135,382

(22) Filed: May 1, 2002

(65) Prior Publication Data

US 2002/0166752 A1 Nov. 14, 2002

(30) Foreign Application Priority Data

May 11, 2001 (JP) ........................................ 2001-141788
Jun. 5, 2001 (JP) ........................................ 2001-169572

(51) Int. Cl.[7] ........................ B65G 47/10; B65G 47/46; B65G 23/44; B65G 21/00; B65G 41/00
(52) U.S. Cl. .................. 198/369.2; 198/813; 198/861.3
(58) Field of Search ............... 198/369.2, 435, 198/437, 464.1, 813, 861.3

(56) References Cited

U.S. PATENT DOCUMENTS

| | | | |
|---|---|---|---|
| 3,456,776 A | * 7/1969 | Viene | 198/813 |
| 4,938,336 A | * 7/1990 | Aquino et al. | 198/369.2 |
| 5,022,514 A | * 6/1991 | Lofberg | 198/813 |
| 5,086,911 A | * 2/1992 | Douglas | 198/632 |
| 5,692,593 A | 12/1997 | Ueno et al. | |
| 5,715,930 A | * 2/1998 | Hogenkamp | 198/435 |
| 6,509,533 B1 | * 1/2003 | Tanaka et al. | 177/126 |

FOREIGN PATENT DOCUMENTS

| | | |
|---|---|---|
| EP | 0 312 643 A1 | 4/1989 |
| EP | 1 101 715 A1 | 5/2001 |
| JP | 2000-159336 | 6/2000 |
| WO | WO99/62796 | 12/1999 |

* cited by examiner

Primary Examiner—Gene O. Crawford
(74) Attorney, Agent, or Firm—Staas & Halsey LLP

(57) ABSTRACT

A product sorter for diverting products (M) towards a plurality of positions by performing an up and down pivotal movement about an axis of rotation (G3) while the products (M) are successively transported includes a transport conveyor (2) adapted to be bent and including a conveyor frame (21), a rotatory drive body (22) mounted on one of opposite ends of the conveyor frame (21), a rotatory driven body (23) mounted on the other of the opposite ends of the conveyor frame (21), and an endless transport belt (24) trained around and between the rotatory drive and driven bodies (22, 23), a drive source (5) for driving the rotatory drive body (22) to drive the transport belt (24); and an actuator (6) for pivoting the support framework (3) up and down. The product sorter is so designed and so configured that in order to enable the transport belt (24) to be easily removed for cleansing by facilitating bending of the transport conveyor (2), an axis of pivot (25a) of the conveyor frame (21) is positioned at a location displaced downwardly from an imaginary straight line (L1) connecting between respective axes of rotation (G1, G2) of the rotatory drive and driven bodies (22, 23), respectively, when the conveyor frame (21) is not bent, and the conveyor frame (21) is adapted to be bent downwardly, and a stopper member (21ca) is employed for inhibiting the conveyor frame (21) from being bent upwardly.

16 Claims, 7 Drawing Sheets

PRODUCT SORTER WITH TRANSPORT CONVEYOR

BACKGROUND OF THE INVENTION

1. Field of the Invention

The present invention relates to a product sorter that may be used as, for example, a selection apparatus for sorting or diverting rejected products out of the normal course of transport of acceptable products. When the products are judged unacceptable at the preceding inspection station where a weighing machine or an inspection machine such as, for example, a metal detector or an X-ray inspecting machine is installed, on the account that they have failed to satisfy the required weight or are found to be either out of allowable weight range or including metal foreign matters.

2. Description of the Prior Art

The product sorter of this kind is known which includes a support frame and a transport conveyor supported by the support frame and including a transport belt trained around and between a drive roller (a drive rotatory body) and a driven roller (a driven rotatory body). The transport conveyor is pivotable together with the support frame about a pivot axis coaxial with the drive roller to divert the rejected products out of the normal course of transportation where the acceptable products are transported. In this type of the product sorter, since the transport conveyor, particularly the transport belt thereof is susceptible to contamination brought about by the products being transported, the transport belt is routinely removed out of the apparatus for detergent or cleansing. To facilitate removal of the transport conveyor belt, the Japanese Laid-open Patent Publication No. 2000-159336, for example, discloses the transport conveyor so designed and so configured as to be bendable or foldable. However, it has been found that when the transport conveyor is folded, screws and stoppers have to be removed, resulting in complicated folding work.

Also, for the diverting operation, left and right side plates of the support bracket are designed to extend downwardly and a pivot shaft is journalled between the respective extensions of the framework side plates in a relation parallel to the pivot axis while an actuator in the form of a pneumatically operated cylinder for activating a diverting operation is coupled with an axially intermediate portion of the pivot shaft. As such, the framework side plate extensions and the pivot shaft having a substantial length are required, resulting in increase in size of the sorter as a whole. Moreover, since the actuator is positioned immediately beneath the transport conveyor, foreign matter such as dirt and/or spills from the products being transported may adhere to the actuator and the actuator may eventually fail to operate properly and/or may be contaminated undesirably.

SUMMARY OF THE INVENTION

In view of the foregoing, the present invention is intended to provide an improved product sorter of a type wherein the transport belt can easily be removed from the transport conveyor of the product sorter for detergent or cleansing.

In order to accomplish the foregoing object of the present invention, the product sorter according to the present invention is designed to divert the products being then forwardly transported to a plurality of positions by performing an up and down pivotal movement about a pivot axis. For this purpose, the product sorter according to the present invention includes a transport conveyor including a conveyor frame, a rotatory drive body mounted on one of opposite ends of the conveyor frame, a rotatory driven body mounted on the other of the opposite ends of the conveyor frame, and an endless transport belt trained around and between the rotatory drive and driven bodies, while the transport conveyor is capable of being bent when mounted on or removed form a support framework; a drive source for driving the rotatory drive body to drive the transport belt; an actuator for pivoting the support framework up and down; and a stopper member for inhibiting the conveyor frame from being bent upwardly. In this product sorter, an axis of pivot of the conveyor frame is positioned at a location displaced downwardly from an imaginary straight line connecting between respective axes of rotation of the rotatory drive and driven bodies, respectively, when the conveyor frame is not bent and the conveyor frame is capable of being bent downwardly.

According to the present invention, since by bending the transport conveyor the distance between the rotatory drive and driven bodies can be shortened, the transport belt can easily be removed from the rotatory drive and driven bodies. It is to be noted that the axis of pivot of the conveyor frame is positioned at a location displaced downwardly from an imaginary straight line connecting between respective axes of rotation of the rotatory drive and driven bodies, respectively, when the conveyor frame is not bent and the conveyor frame is capable of being bent downwardly. In addition, the stopper member for preventing the conveyor frame from being bent upwardly is employed. Accordingly, when the conveyor frame is not bent, that is, held in a straightened position, the conveyor frame tends to bend upwardly about the axis of pivot by the effect of a resilient restoring force of the transport belt. Since this tendency of the conveyor frame to bend upwardly can be inhibited by the stopper member, the conveyor frame can advantageously supported in the straightened position stably with the products assuredly transported thereby. When, starting from this condition the transport conveyor is to be bent, a manual lift of a portion of the transport conveyor adjacent the axis of pivot thereof results in the transport conveyor being pivoted about the axis of pivot and, thus, neither screws nor pins need be turned, thereby facilitating a bending work extremely easy.

The bendable conveyor frame may include, for example, a frame body supporting the rotatory drive body and forming a major portion of the conveyor frame, and a frame segment forming a part of the conveyor frame and supporting the rotatory driven body and supported by the frame body for pivotal movement up and down about a pivot axis 25a extending leftwards and rightwards. This structural feature is effective to provide the bendable conveyor frame of the structure in which the frame body and the frame segment are merely connected together by means of the axis of pivot. Also, since the rotatory drive body, which has hitherto been more complicated in shape than the rotatory driven body because of the use of a mechanism for coupling it with the drive source can be supported by the relatively large frame body, it is possible to design this support means without being constricted by the limited space.

As a method of providing the stopper member, for example, an upper region of the conveyor frame may include ceiling members facing an inside surface of an upper run of the transport belt, so that when the frame segment is bent upwardly, the frame segment can be brought into abutment with a forward end of the ceiling member of the frame body to thereby inhibit the frame segment from being bent upwardly.

In a preferred embodiment of the present invention, the support framework may include a first support unit for supporting one end of the rotary drive body, a second support unit for supporting the other end of the rotary drive body and a pair of third support units for supporting opposite ends of the rotary driven body. The first support unit is provided in correspondence with one end of the rotary drive body for transmitting a drive force from the drive source when the transport conveyor is mounted on the support framework and also for supporting one end of the rotary drive body while inhibiting motion of such one end of the rotary drive body in a direction forwardly and rearwardly and also in a direction upwardly and downwardly. The second support unit is provided in correspondence with the other end of the rotary drive body and opening upwardly for supporting such other end of the rotary drive body while inhibiting motion of such other end of the rotary drive body in a direction forwardly and rearwardly and also in a direction downwardly when the transport conveyor is mounted on the support framework. The third support units are provided in correspondence with the opposite ends of the rotary driven body and opening in a direction towards the rotary drive body, and support the opposite ends of the rotary driven body while inhibiting motion of the opposite ends of the rotary driven body in a direction upwardly and downwardly when the transport conveyor is mounted on the support framework.

According to the foregoing structure, since the third support unit opens towards the rotary drive body, bending of the transport conveyor on the support framework while supporting the transport conveyor at the first and second support units allows the opposite ends of the rotary driven body of the transport conveyor to be moved from the third support unit towards the rotary drive body to thereby separate from the third support unit. When while in this condition the opposite ends of the rotary drive body of the transport conveyor are removed from the first and second support units, the transport conveyor can easily be removed from the support framework. It is to be noted while the transport conveyor is supported on the support framework, the position of the transport conveyor in the forward and rearward direction can be regulated by the first and second support units of the support framework while the position thereof in the up and down direction can be regulated by the first and third support units, and, therefore, the transport conveyor can advantageously stably be supported by the support framework.

In another preferred embodiment of the present invention, the support framework may include a first side plate positioned on one side of any of the rotary drive and driven bodies having the first support unit and one of the third support units, and a second side plate positioned on the other side of any of the rotary drive and driven bodies having the second support unit and the other of the third support units and connected with the actuator. According to this structure, since the actuator and the drive source are arranged on respective sides of the rotary drive body, the apparatus as a whole can be well balanced.

Connection between the rotary drive body and the drive source by the first support unit may take any form. For example, a rotatory connecting shaft and a coupling may be employed for this purpose. In such case, the rotary connecting shaft is to be disposed coaxially with the rotary drive body at a location outside one end of the rotary drive body and arranged to be driven by the drive source, and the coupling is to be used for releaseably connecting the rotary connecting shaft and one end of the rotary drive body for axial movement, but non-rotatably relative to each other. In this case, the first support unit includes a bushing for axially separably retaining the coupling. With this structural feature, by causing the end of the rotary drive body to be mounted or detached axially relative to the bushing of the first support unit, the rotary drive body can easily be connected or separated relative to the drive source through the coupling.

In a further preferred embodiment of the present invention, the first and second support units of the support framework may cooperate with each other to allow the transport conveyor to be supported by the support framework with the axis of rotation of the support framework aligned with the axis of rotation of the rotary drive body, in which case the actuator is connected with the rotary shaft fitted to the second support unit and having the axis of rotation. This design is particularly advantageous in that neither a relatively long shaft for connecting the actuator with the support framework nor any extension of the conveyor frame for mounting the long shaft is needed, resulting in the structure to be simple and compact in size. Also, since the point of action of the actuator coincides with the axis of pivot of the support frame, movable parts including the rotary shaft can be centered at a single location. Therefore, when the protective covering is fitted over the actuator, a sealing between the protective covering and movable member, that is, the rotary shaft is required at only one location, and, accordingly, an assured waterproofing can be obtained.

In such further preferred embodiment of the present invention, the product sorter may also include an end member supported by the conveyor frame for rotatably supporting the other end of the rotary drive body, and the second support unit includes a first receiving groove opening upwardly for receiving an engagement stud of the end member from above to thereby inhibit the engagement stud from being shifted in a direction forwardly and rearwardly and also in a direction downwardly. According to this structural feature, by mounting the end member in the first receiving groove from above or pulling it upwardly from the first receiving groove, the other end of the rotary drive body can easily be mounted on or removed from the conveyor frame.

The third support unit for allowing the opposite ends of the rotary driven body to be supported by the support framework may include, for example, a second receiving groove opening towards the rotary drive body for supporting an engagement projection, provided in the conveyor frame, while inhibiting the engagement projection from being shifted in a direction upwardly and downwardly, and the support framework may be formed with a guide surface inclined upwardly towards the rotary drive body from the second receiving groove for guiding the engagement projection in a direction allowing it to be inserted into or separated from the second receiving groove when the transport conveyor is mounted on or removed from the support framework, respectively. With this structure, the engagement projection of the support framework can be smoothly inserted into or separated from the second receiving groove by the utilization of the guide surface.

Preferably, the axis of rotation of the support framework may be set at one end positioned upstream and the actuator may correspondingly be arranged laterally of the transport conveyor or upstream of the transport conveyor. This is particularly effective in that any possible deposition of dusts on the drive source and/or the actuator during transport of products can be advantageously suppressed and in that the dusts falling below the transport conveyor can easily be cleaned.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, a preferred embodiment of the present invention will be described with reference to the accompanying drawings.

Figure 1:
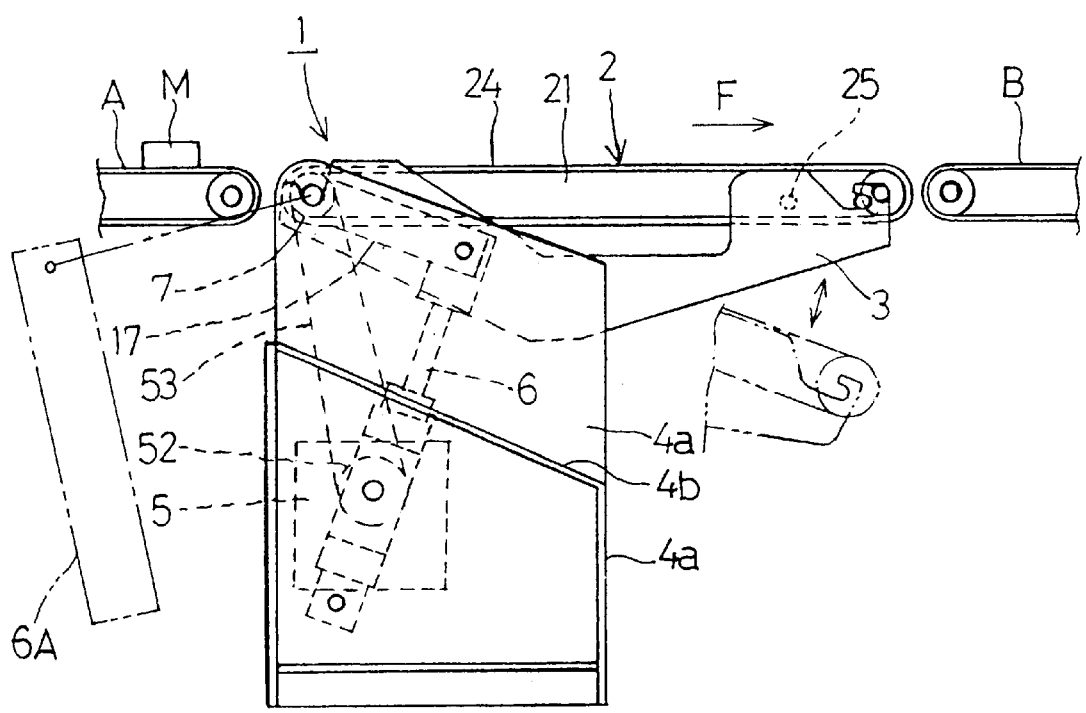
FIG. 1 is a schematic side view showing an overview of a product sorter according to the present invention.

Referring first to FIG. 1, there is shown, in a schematic side representation, the entire product sorter embodying the present invention. The product sorter 1 shown therein includes a transport conveyor 2 for diverting products M while the latter are transported in a predetermined transport direction F, a support bracket or framework 3 made of a stainless steel for removably supporting the transport conveyor 2, and a machine frame structure 4 made of a stainless steel for supporting the support bracket 3 for pivotal movement up and down. The product sorter 1 also includes a drive motor (a drive source) 5 positioned inside the machine frame structure 4 for driving the transport conveyor 2 and a pneumatically operated cylinder (an actuator) 6 also positioned inside the machine frame structure 4 for pivoting the transport conveyor 2 up and down.

Figure 2:
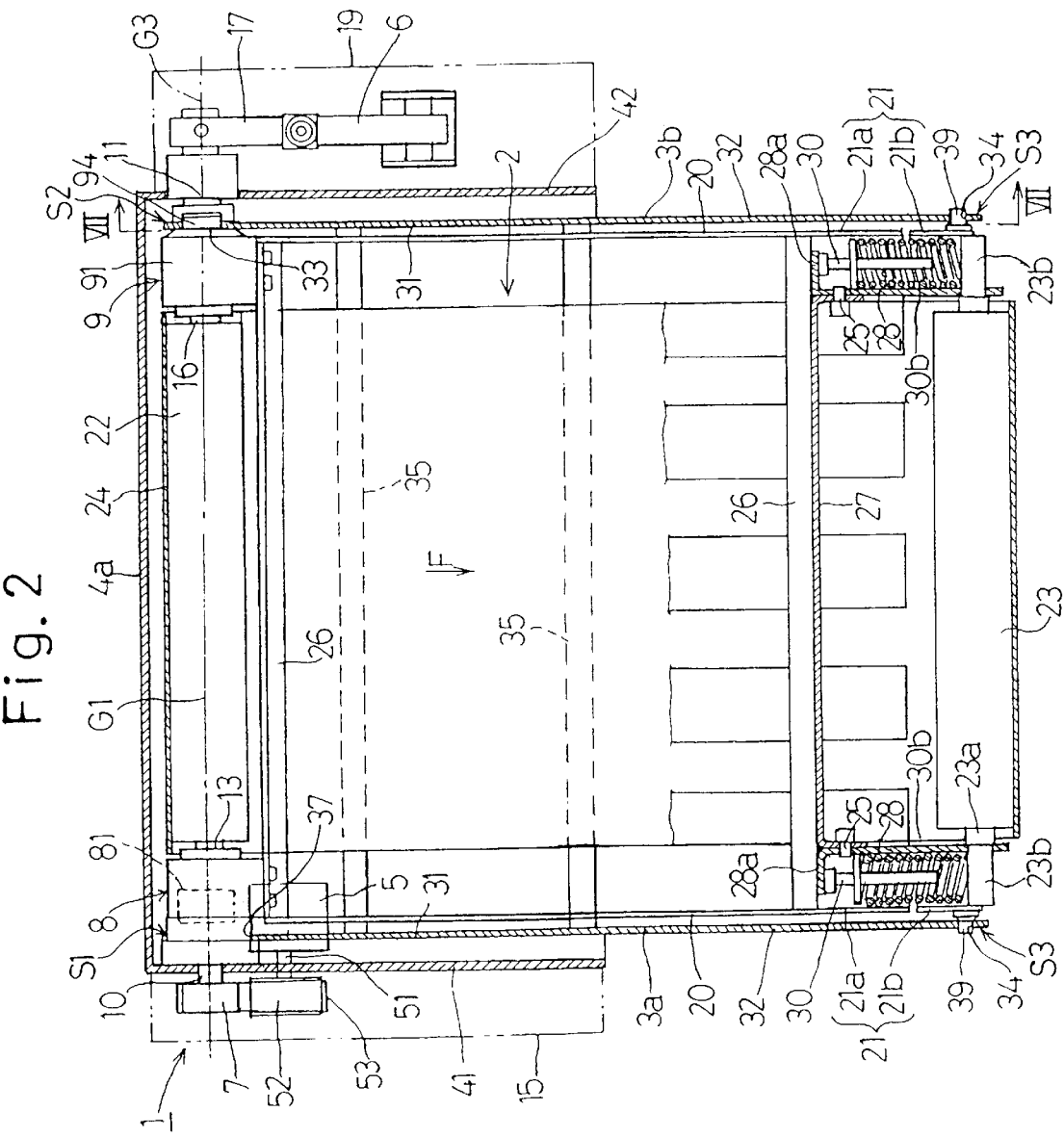
FIG. 2 is a schematic plan view, on an enlarged scale with a portion cut out, showing the product sorter.

FIG. 2 illustrates an enlarged plan representation of the sorter 1 with a portion cut away. The support bracket 3 referred to hereinbefore includes left and right, or first and second, side plates 3a and 3b and two spaced transverse connecting members 35 connected at their opposite ends with the left and right side plates 3a and 3b while extending perpendicular thereto. The transport conveyor 2 referred to hereinbefore includes a conveyor frame 21 made of a stainless steel and having front and rear ends, a drive roller (a rotatory drive body) 22 made of a stainless steel and journalled to the front end of the conveyor frame 21, a driven roller (a rotatory driven body) 23 also made of a stainless steel and journalled to the rear end of the conveyor frame 21, and a transport belt 24 in the form of an endless flat belt made of a synthetic resin and trained around and between the drive and driven rollers 22 and 23. The first side plate 3a of the support bracket 3 is positioned on one side, i.e., a left side, of the drive and driven rollers 22 and 23 whereas the second side plate 3b thereof is positioned on the other side, i.e., a right side, of the drive and driven rollers 22 and 23. The conveyor frame 21 includes a generally elongated frame body 21a and a relatively short frame segment 21b positioned adjacent a forward end of the frame body 21a with respect to the transport direction F. The short frame segment 21b is supported for pivotal movement up and down relative to the frame body 21a about a pivot axis 25a defined by pivot pins 25 and extending perpendicular to the transport direction F. Thus, the short frame segment 21b is pivotable about the pivot axis 25a between a straightened position, in which the frame body 21a and the short frame segment 21b are in line with each other, and a folded position in which the short frame segment 21b is at an angle to the frame body 21a as will be described later. The frame body 21a includes left and right side plates 20 and 20 and two spaced connecting members 26 and 26 connected at their opposite ends to the left and right side plates 20 and 20, respectively.

Figure 3:
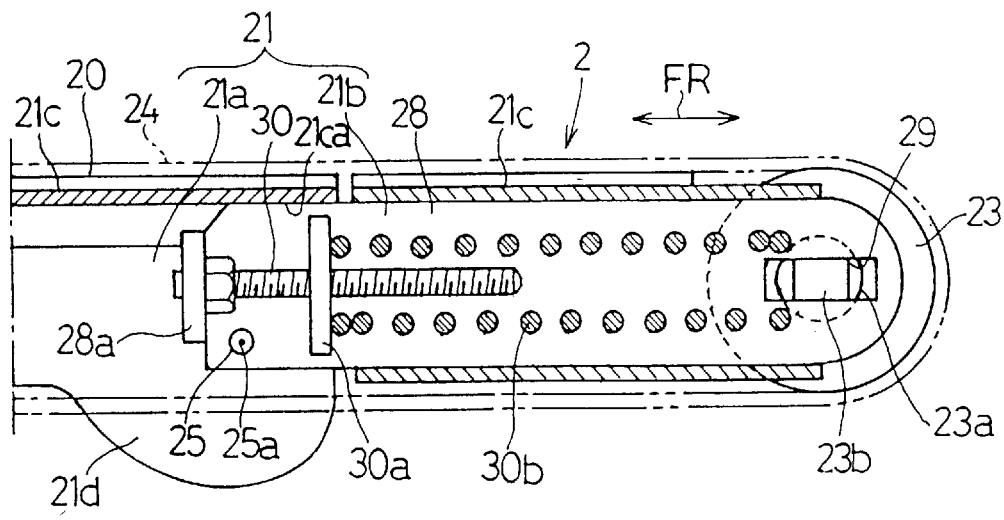
FIG. 3 is a fragmentary longitudinal sectional view, on an enlarged scale, showing a frame segment of a conveyor frame of a transport conveyor used in the product sorter.
Figure 4:
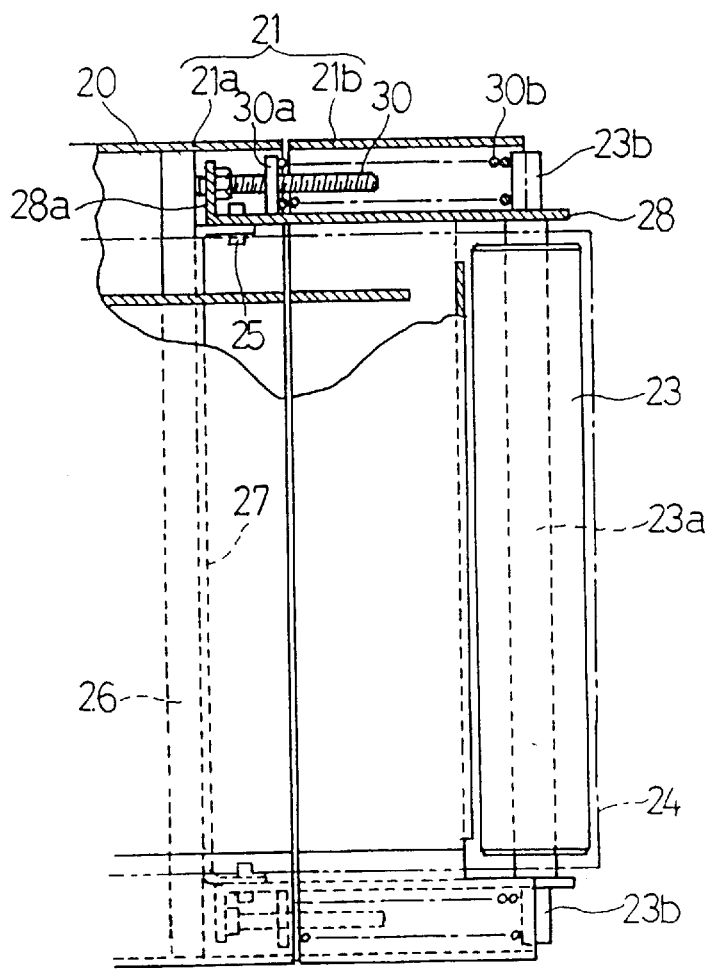
FIG. 4 is a plan view, on an enlarged scale, of the frame segment.

FIGS. 3 and 4 are longitudinal sectional and plan views, both on an enlarged scale, showing the details of the frame segment 21b forming a part of the conveyor frame 21. As best shown in FIG. 4, one of the connecting members 26 that is positioned adjacent the forward end of the frame body 21a, that is, the forward connecting member 26 is provided with a mounting member 27 of a generally U-shaped configuration as viewed in a plan representation. On the other hand, a pair of generally L-shaped support members 28 for supporting opposite ends of the driven roller 23, respectively, are fixed inside the frame segment 21b opposite to each other in a direction widthwise thereof, which support members 28 are in turn pivotally mounted on the mounting member 27 through pivot pins 25 defining the pivot axis 25a. Also, generally rectangular slots 29 are, as best shown in FIG. 3, defined on one side adjacent the forward end of the support member 28 so as to extend in a direction conforming to a direction indicated by the arrow FR, while generally rectangular slides 23b adapted to be inserted into the respective slots 29 are formed in respective stud shafts 23a of the driven roller 23 so as to protrude outwardly therefrom. By inserting the slides 23b into the associated slots 29, the stud shafts 23a of the driven roller 23 is supported by the frame segment 21b non-rotatably, but slidably in the direction FR with the stud shaft 23a guided within the associated slots 29. At this time, the driven roller 23 is rotatable relative to the stud shaft 23a and can therefore be rotated as the transport belt 24 runs in a direction conforming to the transport direction F.

Each of the support members 28 has its rearward end bent at right angles to define a bent piece 28a that protrudes in a direction laterally outwardly therefrom, and a respective screw rod 30 is adjustably received in the bent piece 28a. A plate member 30a is threadingly mounted on the screw rod 30 with a coil spring 30b mounted therearound and interposed between the plate member 30a and the adjacent slide 23b for biasing the driven roller 23 in a forward direction conforming to the transport direction F. In this way, when each screw rod 30 is turned to move the corresponding plate member 30a in either direction relative to the frame segment 21b, the driven roller 23 can be moved through the associated coil spring 30b with the rectangular slide 23b guided within and along the respective slot 29 so that the span between the driven roller 23 and the drive roller 22 can be adjusted. As a result, even though the transport belts 24 as manufactured have a variation in length, the transport belt 24 employed in the particular transport conveyor 2 can be held under a proper tension to facilitate a smooth successive conveyance of the products M.

In the embodiment now under discussion, as best shown in FIG. 3, ceiling members 21c facing an inside surface of an upper run of the transport belt 24 are disposed on an upper region of both of the frame body 21a and the frame segment 21b. A lower region of the frame body 21a is formed integrally with generally arcuate swellings 21d for externally covering the pivot pins 25 defining the pivot axis 25a and their surroundings, such that when the frame segment 21b is bent or pivoted relative to the frame body 21a, the swellings 21d can protect an operator's hands from being inadvertently extended in between the frame body 21a and the frame segment 21b.

Figure 7:
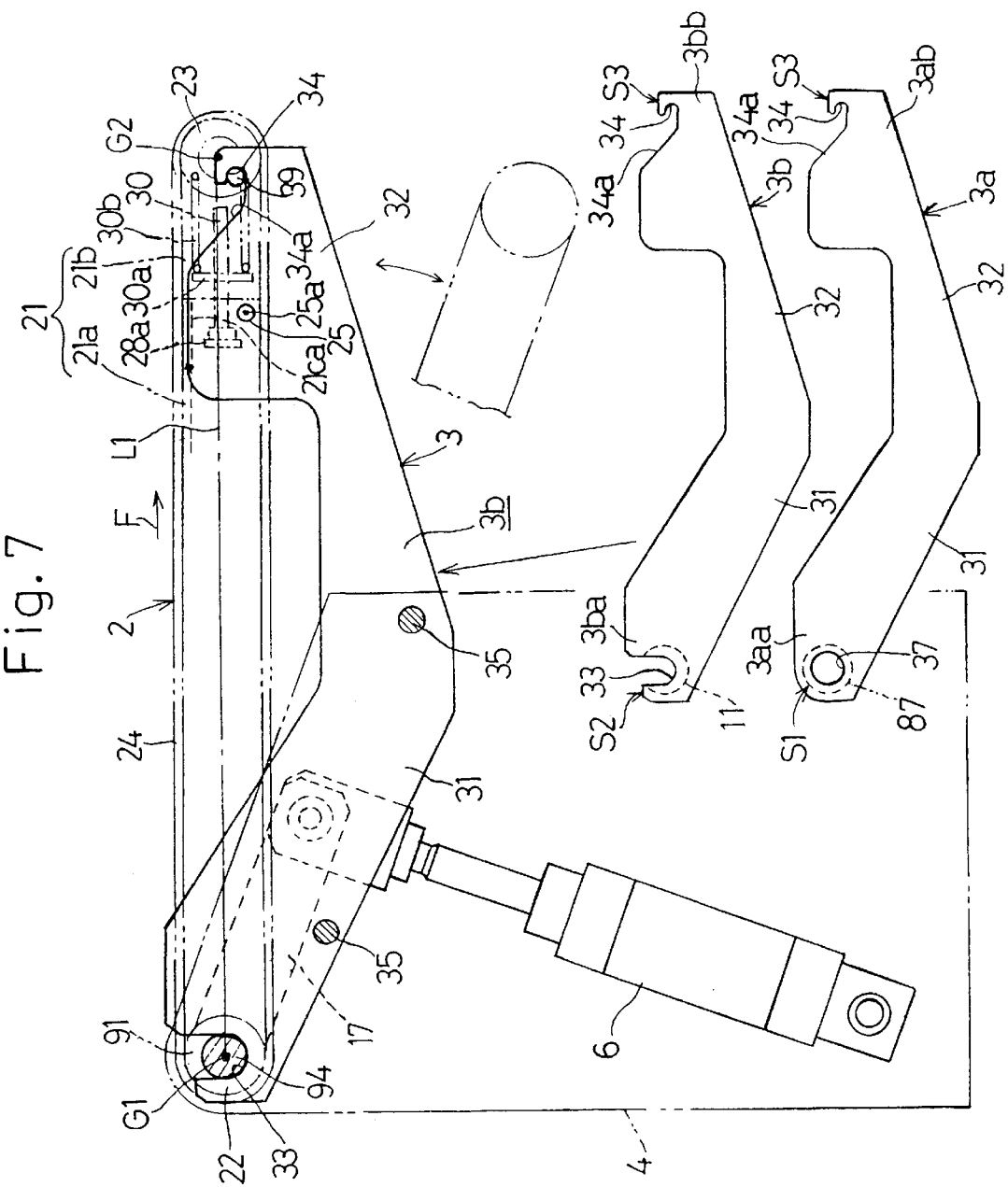
FIG. 7 is a cross-sectional view, on an enlarged scale, taken along the line VII—VII in FIG. 2.

As best shown in FIG. 7, the pivot axis 25a commonly defined by the pivot pins 25 is so defined and so positioned as to extend below the imaginary straight line L1 drawn to connect respective axes G1 and G2 of rotation of the drive and driven rollers 22 and 23 when and so long as the frame segment 21b is held at the straightened position relative to the frame body 21a. Accordingly, so long as the frame segment 21b is held at the straightened position relative to the frame body 21a as shown in FIG. 7, the frame segment 21b tending to bend or pivot upwards, as viewed in FIGS. 3 and 7, about the pivot axis 25a by the effect of a resilient restoring force of the transport belt 24 can be advantageously barred from pivoting upwards because of the frame segment 21b having been brought into abutment with a forward end 21ca of one of the ceiling members 21cincluded in the frame body 21a shown in FIG. 3. In other words, the forward end 21ca referred to above functions as a stopper for preventing the frame segment 21b from pivoting upwards as viewed in FIGS. 3 and 7. Also, since the pivot axis 25a lies below the imaginary straight line L1 drawn to connect the respective axes G1 and G2 of rotation of the drive and driven rollers 22 and 23 as hereinbefore described and as shown in FIG. 7, the frame segment 21b does not bend or pivot downwards relative to the frame body 21a solely by the effect of the resilient restoring force of the transport belt 24. Accordingly, by the effect of the resilient restoring force of the transport belt 24 trained around the drive and driven rollers 22 and 23, the frame body 21a and the frame segment 21b can be held stably in line with each other at the straightened position to allow a smooth successive transport of the products M forwards in the transport direction F.

As best shown in FIG. 2, an upper region 4a of the machine frame structure 4 has its forward portion opening outwardly to provide a generally U-shaped space delimited by opposite, left and right side walls 41 and 42. A drive pulley 7 drivingly coupled with the previously described drive motor 5 for driving the drive roller 22 of the transport conveyor 2 is mounted on the left side wall 41 and positioned laterally outside the left side wall 41 with respect to the generally U-shaped space whereas the previously described pneumatically operated cylinder 6 in the form of an air cylinder is mounted on the right side wall 42 and positioned laterally outside the right side wall 42 with respect to the generally U-shaped space. The drive roller 22 has its opposite ends rotatably supported by the left and right side walls 41 and 41 by means of first and second coupling mechanisms 8 and 9, respectively. The first coupling mechanism 8 has a left outer side provided with a rotary coupling shaft 10 protruding outwardly therefrom through the left side wall 41, and a rotary shaft 11 extending outwardly through the right side wall 42 is mounted on the second side plate 3b and positioned on a right outer side of the second coupling mechanism 9. The axis of rotation G1 of the drive roller 22, that is, the axis of rotation of each of rotary coupling shaft 10 and left and right rotary shafts 13 and 16 protruding from opposite end portions of the drive roller 22, and the axis of rotation G3 of the rotary shaft 11 about which the pneumatically operated cylinder 6 causes the transport conveyor 2 to pivot are coaxial with each other at a location adjacent an upstream end of the support bracket 3.

The drive pulley 7 referred to hereinbefore is mounted on the left rotary coupling shaft 10 while a right rotary coupling shaft 11 is drivingly coupled with the pneumatically operated cylinder 6. In this way, the drive motor 5 is drivingly connected with one end (a left end) of the rotary drive body 22 through the rotary shaft 10 and the drive pulley 7, and the pneumatically operated cylinder 6 is drivingly connected through the rotary shaft 11 with the second side plate 3b supporting the opposite end (a right end) of the rotary drive body 22. Transmission of the drive from the drive motor 5 to the drive pulley 7 takes place by way of a timing belt 53 trained around and between the drive motor 5 and the drive pulley 7. The drive motor 5 referred to hereinbefore is positioned below one side (a left side) of the transport conveyor 2 whereas the pneumatically operated cylinder 6 is positioned adjacent the opposite side (a right side) of the transport conveyor 2.

Figure 5:
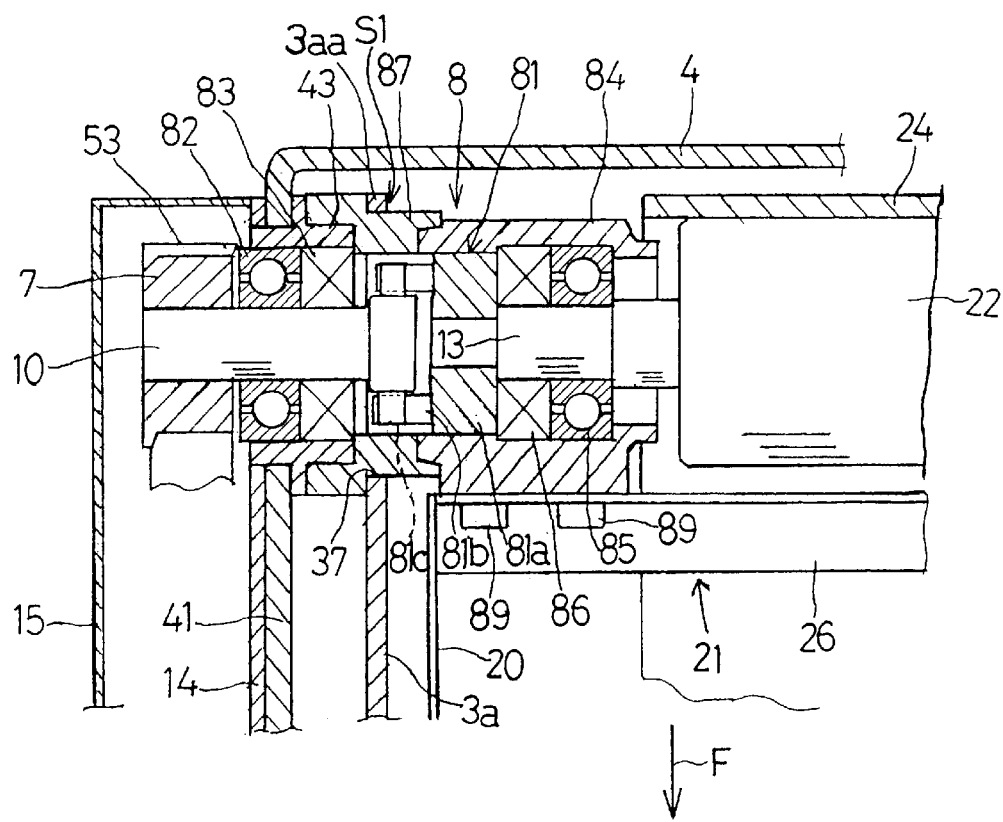
FIG. 5 is a fragmentary sectional view, on an enlarged scale, showing a first coupling mechanism used in the transport conveyor.

FIG. 5 illustrates an enlarged sectional view showing the first coupling mechanism 8 positioned on one side of the support bracket 3 adjacent the left or first side plate 3a and at a location rearwardly thereof with respect to the transport direction F. The first coupling mechanism 8 includes a coupling 81 interposed between the rotary coupling shaft 10 and the left rotary shaft 13 protruding axially outwardly from the drive roller 22 and is operable to releaseably connect the shafts 10 and 13 together, that is, capable of assuming engaged and disengaged positions in which the shafts 10 and 13 are coupled together and decoupled from each other, respectively. Thus, when in the engaged position, the coupling 81 transmit the drive of the rotary coupling shaft 10 therethrough to the drive roller 22 of the transport conveyor 2 to drive the latter, but when in the disengaged position, the coupling 81 separates the rotary coupling shaft 10 axially away from the drive roller 22, thereby allowing the transport conveyor 2 to be removed from the machine frame structure 4 with the shafts 10 and 13 decoupled from each other.

The coupling 81 is of a standard structure and includes a cylindrical casing 81a connected axially with the left rotary shaft 13 fast or rigid with the drive roller 22, a pair of circumferentially spaced engagement pegs 81b secured thereto so as to extend axially outwardly therefrom, and a pin 81c extending radially across a free end portion of the rotary coupling shaft 10 with its opposite ends protruding outwardly from that end portion of the rotary coupling shaft 10 for engagement with the respective engagement pegs 81b so that when the engagement pegs 81b are circumferentially engaged with the corresponding opposite ends of the pin 81c with the coupling 81 held in the engaged position, rotation of the rotary coupling shaft 10 can be transmitted to the drive roller 22 as will be described later. A first annular cap 43 is fixedly mounted, by means of any suitable connecting means such as, for example, welding, on the base end portion or rear end portion of the left side plate 41 of the machine frame structure 4 so as to extend inwardly thereof, and a bearing 82 for rotatably supporting the rotary coupling shaft 10 and an oil seal 83 are accommodated within the annular cap 43. The left rotary shaft 13 of the drive roller 22 is inserted into a substantially cylindrical side cap 84 fixedly connected to the connecting member 26 through a plurality of bolts 89, and a bearing 85 for rotatably supporting the left rotary shaft 13 and an oil seal 86 are accommodated within such cylindrical side cap 84. Thus, it will readily be seen that one end of the rotatory drive body 22 is supported by a rearward end of the conveyor frame 21.

The left or first side plate 3a of the support bracket 3 has its rearward or base end portion 3aa formed with a mounting hole 37 into which a bushing 87 made of a synthetic resin is press-fitted from the left side so as to protrude laterally rightwards as viewed in FIG. 5 towards the drive roller 22. A left end portion of the resinous bushing 87 is mounted rotatably on an outer peripheral surface of the annular cap 43 fixed to the machine frame structure 4, and the coupling 81 referred to hereinabove is disposed inside an right end portion of the resinous bushing 87 that protrudes away from the first side plate 3a and also inside the side cap 84 having one end portion received within the right end portion of the resinous bushing 87. In this way, the bushing 87 serves to retain the coupling 81 in an axially immovable fashion.

Also, in the illustrated embodiment, a protective covering 15 for protecting the drive pulley 7 and the timing belt 53 is fitted through a mounting plate 14 to an outer surface of the left side wall 41 of the machine frame structure 4. The bushing 87 secured in the mounting hole 37 in the first side plate 3a of the support bracket 3 and the pin 81c of the coupling 81 that is fixedly mounted on the left end portion of the rotary coupling shaft 10 altogether form a first support unit S1. This first support unit S1 is provided in correspondence with the one end of the rotatory drive body 22 and is operable to transmit the drive of the drive motor 5 to the rotatory drive body 22 when the transport conveyor 2 is mounted on the support bracket 3 and also to support that end of the rotatory drive body 22 so that that end of the rotatory drive body 22 will not displace in a direction forwardly and rearwardly of the transport conveyor 2 and also in a direction up and down relative to the machine frame structure 4.

When the transport conveyor 2 is to be removed from the rotary coupling shaft 10, the drive roller 22 has to be pulled axially inwardly thereof together with the side caps 84, allowing the engagement pegs 81b to be disengaged from the corresponding opposite ends of the pin 81c rigid on the rotary coupling shaft 10. Conversely, when the transport conveyor 2 is to be coupled with the rotary coupling shaft 10, the drive shaft 22, together with the side cap 84, has to be pushed axially outwardly onto the rotary coupling shaft 10 until the opposite ends of the pin 81c are received in between the engagement pegs 81b of the coupling 81 so that the rotary coupling shaft 10 and the drive roller 22 cannot undergo rotation relative to each other, that is, are coupled with each other for rotation together with each other.

Figure 6:
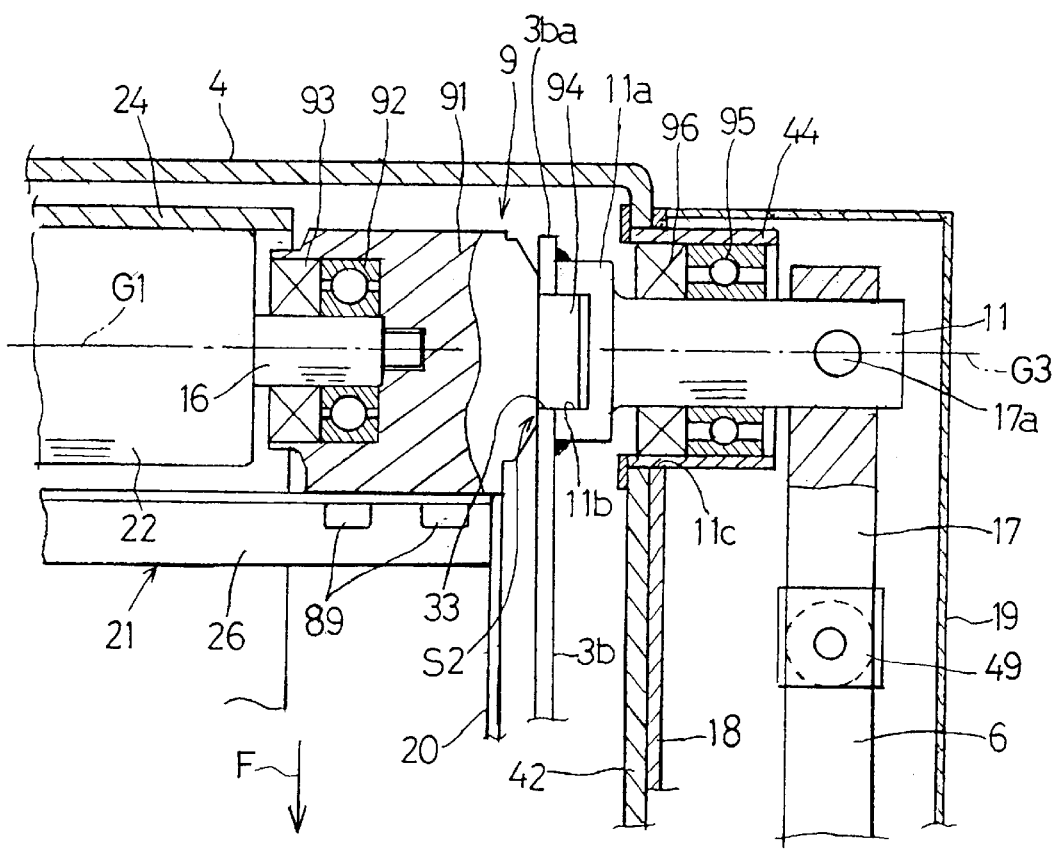
FIG. 6 is a fragmentary sectional view, on an enlarged scale, showing a second coupling mechanism used in the transport conveyor.

FIG. 6 illustrates an enlarged sectional view showing the second coupling mechanism 9 positioned on one side of the support bracket 3 adjacent the right or second side plate 3b and at a location rearwardly thereof with respect to the transport direction F. This second coupling mechanism 9 includes an end member 91 interposed between the right rotary shaft 16, protruding coaxially outwardly from the drive roller 22, and the right rotary shaft 11. A bearing 92 for rotatably supporting the right rotary shaft 16, and an oil seal 93 are accommodated within the end member 91. This end member 91 is fixed to the connecting member 26 of the conveyor frame 21 by means of a plurality of bots 89. The end member 91 has a right end portion formed with a non-cylindrical engagement stud 94 of a relatively small diameter and, on the other hand, a base end portion or rearward end portion 3ba of the second side plate 3b of the support bracket 3 is provided with a second support unit S2 including a generally U-shaped first receiving groove 33 opening upwardly for receiving the engagement stud 94 relatively non-rotatably. This second support unit S2 is provided in correspondence with the other end of the rotatory drive body 22 and is operable to support it in position without allowing the other end of the rotatory drive body 22 to displace in a direction forwardly and rearwardly of the transport conveyor 2 and also in a direction downwardly relative to the machine frame structure 4 when and so long as the transport conveyor 2 is mounted on the support bracket 3.

The left end of the right rotary shaft 11 fixed in and by the second support unit S2 is integrally formed with a large diameter portion 11a of a larger diameter than that of the rotary shaft 11, which is in turn formed with an upwardly opening engagement groove 11b of a shape complemental to the shape of the engagement stud 94. When the transport conveyor 2 is to be separated from the right rotary shaft 11, the drive roller 22, together with the end member 91 coupled thereto, has to be pulled upwardly until the engagement stud 94 is disengaged from the engagement groove 11b in the right rotary shaft 11. On the other hand, when the transport conveyor 2 is to be mounted on the right rotary shaft 11, the engagement stud 94 of the end member 91 has to be engaged into the engagement groove 11b in the rotary shaft 11 to thereby connect the drive roller 22 relatively non-rotatably with the rotary shaft 11.

The side cap 84 shown in FIG. 5 and the end member 91 shown in FIG. 6, which are positioned adjacent the opposite ends of the drive roller 22, respectively, are both, as mentioned above, fixed to the connecting member 26 of the conveyor frame 21 by means of the associated bolts 89 with the other end of the drive roller 22 consequently supported by the rear end portion of the conveyor frame 21.

In the illustrated embodiment, a second annular cap 44 is fixed to the rearward end of the right side plate 42 of the machine frame structure 4 so as to extend axially outwardly therefrom, and a bearing 95 for rotatably supporting the right rotary shaft 11 and an oil seal 96 are accommodated within the annular cap 44. The rotary shaft 11 has a free end portion connected with an adjacent end of a rocking link 17 by means of a connecting pin 17a, and the opposite end of the rocking link 17 is connected with the pneumatically operated cylinder 6 through a universal joint 49. A protective covering 19 is fitted to an outer surface of the right side wall 42 of the machine frame structure 4 through a mounting plate 18 for covering and protecting the pneumatically operated cylinder 6 in its entirety, thereby avoiding the possibility of the pneumatically operated cylinder 6 getting dirty and/or failing to operate properly which would otherwise occur when foreign matter such as, for example dusts deposit on the pneumatically operated cylinder 6.

The left rotary connecting shaft 10 of the drive roller 22 shown in FIG. 2 is connected with the drive motor 5 and the right rotary shaft 11 is connected with the pneumatically operated cylinder 6. Thus, since the drive motor 5 and the pneumatically operated cylinder 6 are disposed on respective sides of the drive roller 22 as hereinabove discussed, the sorter of the present invention is well balanced with respect to space and weight.

FIG. 7 illustrates, on an enlarged scale, the cross-section taken along the line VII—VII in FIG. 2. As shown therein, the first and second side plates 3*a* and 3*b* positioned on respective sides of the transport conveyor 2 for removably supporting the transport conveyor 2 include generally V-shaped first and second arms 31 and 32, respectively. The left or first side plate 3*a* is provided with the first support unit S1 including the bushing 87 engaged in the mounting hole 37 that is defined in the rearward or base end portion 3*aa* of the first arm 31, while a forward end 3*ab* of the second arm 32 is formed with a third support unit S3 provided in correspondence with the left end of the rotatory driven body 23. This third support unit S3 has a second receiving groove 34 engageable with an engagement projection 39, which is formed in the forward end of the frame segment 21*b* of the conveyor frame 21 so as to protrude outwardly therefrom, to thereby indirectly support the rotatory driven body 23 through the frame segment 21*b*.

On the other hand, the right or second side plate 3*b* is provided with the second support unit S2 including the upwardly opening first receiving groove 33, which is formed in a rearward or base end 3*ba* of the first arm 31, for engagement with and supporting an engagement stud 94 of the end member 91. This first receiving groove 33 is adapted to be aligned with the engagement groove 11*b* in the rotary shaft 11 shown in FIG. 5 so that this first receiving groove 33 can cooperate with the engagement groove 11*b* to receive the engagement stud 94 therein. Also, as shown in FIG. 6, the forward end 3*bb* of the second arm 32 is formed with the third support unit 3S including a second receiving groove 34, similar to that in the first side plate 3*a* and engageable with the engagement projection 39 that is formed in the forward end of the frame segment 21*b* of the conveyor frame 21 so as to protrude outwardly therefrom. The second receiving grooves 34 and 34 in the respective side plates 3*a* and 3*b* are opening rearwardly towards the rotatory drive body 22 so that when the transport conveyor 2 is to be mounted onto the support bracket 3 the opposite ends of the rotatory driven body 23 can be supported snugly without allowing them to shift up and down undesirably.

The second receiving groove 34 in the second arm 32 of each of the first and second side plates 3*a* and 3*b* is formed with an inclined surface 34*a* inclined at a moderate gradient in a direction rearwardly upwardly, that is, inclined upwardly from the second receiving groove 34 towards the rotatory drive body 22. Accordingly, when the transport conveyor 2 is to be mounted on or removed from the support bracket 3, the engagement projection 39 can be guided along the inclined surface 34*a* into or out from the second receiving groove 34, respectively.

The first and second side plates 3*a* and 3*b* of the support bracket 3 are connected with the left and right side walls 41 and 42, respectively, so as to be pivotable up and down. In other words, the first side plate 3*a* has the mounting hole 37 defined therein for fixing the bushing 87 which is in turn rotatably mounted on the first annular cap 43 fixed to the left side wall 41 (See FIG. 5), while the second side plate 3*b* has the rotary shaft 11 connected thereto which shaft 11 is in turn rotatably supported by the second annular cap 44 fixed to the right side plate 42 through the bearing 95 (See FIG. 6). When the transport conveyor 2 is to be washed, only the transport conveyor 2 has to be removed from the first and second side plates 3*a* and 3*b* connected with the machine frame structure 4. Also, in the event that some of the, products being transported by the transport conveyor 2 are found to be defective and are therefore to be rejected by the sorter, the first and second side plates 3*a* and 3*b* will be pivoted downwardly together with the transport conveyor 2 by means of rotation of the rotary shaft 11 effected by the pneumatically operated cylinder 6.

Hereinafter, the operation of the sorter of the structure described hereinbefore will now be described.

During the operation being performed to divert the products, the rotational drive of the drive motor 5 shown in FIG. 2 is transmitted to the transport conveyor 2 through the drive pulley 7 and then through the rotary connecting shaft 10 by way of the coupling 81 of the first coupling mechanism 8 with the transport belt 24 consequently driven in one direction. In the event that the products M in FIG. 1 weighed one at a time by a weighing conveyor A positioned in a preceding station have been found satisfying the required weight, the transport conveyor 2 is held in position horizontally level with front-stage and rear-stage conveyors A and B, as shown by the solid line, so that the transport conveyor 2 can receive the products M from the rear-stage conveyor A and then deliver them onto the front-stage conveyor B successively for processing at the subsequent station. On the other hand, in the event that the products M have been found diverting from the required weight, that is, either overweight or underweight, and are hence to be rejected, the pneumatically operated cylinder 6 is activated to pivot the rocking link 17 downwardly, accompanied by rotation of the rotary shaft 11 (FIG. 2) so that the transport conveyor 2 in its entirety is pivoted downwardly together with the support bracket or framework 3 as shown by the phantom line to allow the products M to be rejected from the transport conveyor 2 onto a recovery conveyor (not shown).

Figure 8:
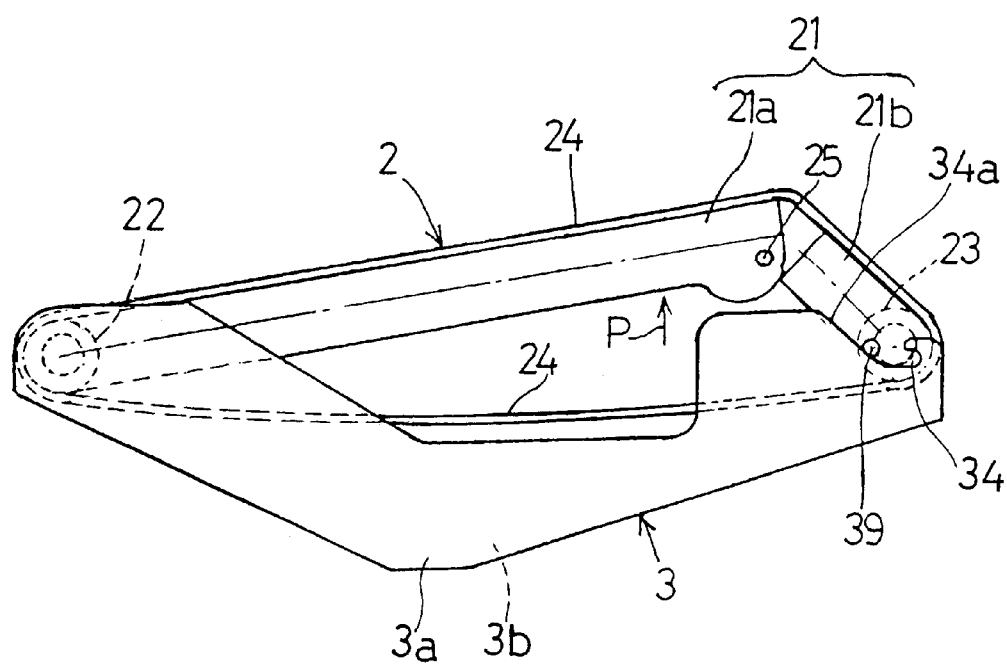
FIG. 8 is a schematic side view of the transport conveyor, showing the manner of removal of the transport conveyor.

When the transport conveyor 2 in its entirety including the transport belt 24 and the conveyor frame 21 is desired to be washed or cleansed, a portion of the transport conveyor 2 adjacent the pivot pins 25 between the frame body 21*a* and the frame segment 21*b* has to be, as shown in FIG. 8, manually lifted to allow the frame segment 21*b* to be forcibly bent or pivot about the pivot pins 25 relative to the frame body 21*a*. As the frame segment 21*b* is so pivoted to assume the folded position in this manner, the distance between the drive and driven rollers 22 and 23 becomes smaller than that when the frame segment 21*b* is in the straightened position with the engagement projections 39 at the frontward end of the transport conveyor 2 disengaged simultaneously from the respective receiving grooves 34 in the first and second side plates 3*a* and 3*b*. In this connection, since neither screw nor pin is needed to be removed when the transport conveyor 2 is to be bent or pivoted in this way, the bending of the transport conveyor 2 can extremely easily be achieved. Also, even when the transport conveyor 2 is to be removed from the support bracket or framework 3, neither engagement member nor screw is needed to be removed and, therefore, the removal of the transport conveyor 2 can also be easily achieved. In addition, since while the transport conveyor 2 is supported by the support bracket or framework 3, forward and rearward positions of the transport conveyor 2 are regulated respectively by the first and second support units S1 and S2 of the support bracket or framework 3 while upward and downward positions of the transport conveyor 2 with respect to the vertical direction are regulated respectively by the first and third support units S1 and S3, the transport conveyor 2 can be stably and steadily supported by the support bracket or framework 3.

By upwardly lifting the drive roller 22 of the transport conveyor 2 together with the end member 91 coupled with the drive roller 22 as shown in FIG. 6 to allow the engagement stud 94 to be disengaged from the engagement groove 11*b* in the rotary shaft 11 and by shifting the drive roller 22 laterally and slantwise upwardly until it disengages from the coupling 81 (FIG. 5), followed by upward shift of the transport conveyor 2, only the transport conveyor 2 can be removed from the support bracket 3. Thereafter, the transport belt 24 is to be removed from the transport conveyor 2 for washing or cleaning. At this time, consequent upon bending of the transport conveyor 2 about the pivot axis 25 shown in FIG. 8, the distance between the drive roller 22 and the driven roller 23 is shortened enough to allow the transport belt 24 to be laterally slipped off from the transport conveyor 2.

When after the washing or cleansing of the transport belt 24 the transport conveyor 2 is to be mounted on the side plates-3a and 3b, the procedure substantially reverse to that described above has to be performed and this can easily be done.

As shown in FIG. 2, the axis of rotation G1 of the drive roller 22, that is, each of the respective axes of the rotary connecting shaft 10 and the left and right rotary shaft 13 and 16, and the axis of rotation G3 of the rotary shaft 11 that defines a point of action when the pneumatically operated cylinder 6 pivots the transport conveyor 2 are coaxial with each other with the pneumatically operated cylinder 6 connected with the rotary shaft 11. According to this design, since that point of action of the pneumatically operated cylinder 6 does not move, neither a relatively long shaft for connecting the pneumatically operated cylinder 6 with the support bracket 3 nor any extension of the conveyor frame 21 for supporting such relatively long shaft is needed and, accordingly, the structure can be simplified in a compact size. Also, since the point of action of the pneumatically operated cylinder 6 is in coincidence with the axis of rotation G3 of the rotary shaft 11 of the support bracket 3, when the protective covering 19 is mounted on the pneumatically operated cylinder 6, movable parts including the rotary shaft 11 can be concentrated at a single location and, therefore, the protective covering 19 is sufficient to have a relatively small round hole for passage of the rotary shaft 11 therethrough. In other words, in the embodiment shown in FIG. 6, the mounting plate 18 fixed to the right side wall 42 of the machine frame structure 4 is sufficient to have a single round hole 11c formed therein for passage of the annular cap 44 therethrough. Accordingly, waterproof inside the projective covering 19 can be assuredly secured.

In addition, since the drive pulley 7 for driving the drive roller 22 and the pneumatically operated cylinder 6 are positioned on respective sides of the transport conveyor 2, even when the drive pulley 7 and the pneumatically operated cylinder 6 are not covered by the respective protective coverings 15 and 19, any possible fall of foreign matter such as, for example, dusts directly onto the drive pulley 7 and/or the pneumatically operated cylinder 6 during transport of the products M can advantageously suppressed and, also, the drive pulley 7 and the pneumatically operated cylinder 6 can easily be services, inspected and/or washed even though the transport conveyor 2 is not removed. Accordingly, there is no possibility that the pneumatically operated cylinder 6 may fail to operate properly and advantages can also be appreciated in terms of hygienic aspect. It is to be noted that any possible dusts falling downwardly of the transport conveyor 2 can be collected on a center plate 4b of the machine frame structure 4 shown in FIG. 1 and, therefore, cleaning can be performed easily.

It is to be noted that in the foregoing embodiment the pneumatically operated cylinder 6 has been described as disposed on one side of the transport conveyor 2, a pneumatically operated cylinder 6A such as, for example, an air cylinder may be disposed at a location upstream of an upstream end of the transport conveyor 2 (the leftward of the transport conveyor 2 in FIG. 1) as shown by the double-dotted phantom line. Also, although in the foregoing embodiment, the drive motor 5 has been described as positioned beneath the transport conveyor 2, the drive motor may be positioned at a location laterally of the transport conveyor 2 or upstream of the transport conveyor 2 in a manner similar to the pneumatically operated cylinder 6A. This makes it possible to suppress the possibility of the foreign matter falling directly onto the pneumatically operated cylinder 6A and/or the drive motor 5 during the transport of the products M and, even though the transport conveyor 2 is not removed, the pneumatically operated cylinder 6A and/or the drive motor 5 can easily be serviced, inspected and washed. Yet, the preceding stage of the product sorter of the present invention may not be always limited to the weighing machine such as the weighing conveyor, but may be an inspecting machine such as, for example, a metal detector or an X-ray inspecting machine.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A product sorter for diverting products towards a plurality of positions by performing an up and down pivotal movement about an axis of rotation while the products are successively transported in a forward direction, said product sorter comprising:

a support framework;

a transport conveyor including a conveyor frame, a rotatory drive body mounted on one of opposite ends of the conveyor frame, a rotatory driven body mounted on the other of the opposite ends of the conveyor frame, and an endless transport belt trained around and between the rotatory drive and driven bodies, the support framework for supporting the transport conveyor, said conveyor frame is capable of being bent downwardly around an axis of pivot when the transport conveyor is being mounted on the support framework or being removed from a mounted position on the support framework;

a drive source for driving the rotatory drive body to drive the transport belt;

an actuator for pivoting the support framework up and down; and a stopper member for inhibiting the conveyor frame from being bent upwardly when the transport conveyor is supported by the support framework;

wherein the axis of pivot is positioned at a location displaced downwardly from an imaginary straight line connecting between respective axes of rotation of the rotatory drive and driven bodies when the conveyor frame is not bent and the transport conveyor is supported by the support framework.

2. The product sorter as claimed in claim 1, wherein the axis of rotation of the support framework is set at one end positioned upstream and the actuator is arranged laterally of the transport conveyor or upstream of the transport conveyor.

3. The product sorter as claimed in claim 1, wherein the conveyor frame includes a frame body supporting the rotatory drive body, and a frame segment supporting the rotatory driven body and supported by the frame body for pivotal movement up and down about the pivot axis.

4. The product sorter as claimed in claim 3, wherein the conveyor frame includes ceiling members facing an inside surface of an upper run of the transport belt, and the stopper member for inhibiting the frame segment from being bent upwardly is defined by a forward end of a ceiling member of the frame body.

5. The product sorter as claimed in claim 1, wherein the support framework comprises:
    a first support unit provided in correspondence with one end of the rotatory drive body for transmitting a drive force from the drive source when the transport conveyor is mounted on the support framework and also for supporting one end of the rotatory drive body while inhibiting motion of such one end of the rotatory drive body in a direction forwardly and rearwardly and also in a direction upwardly and downwardly;
    a second support unit provided in correspondence with the other end of the rotatory drive body and opening upwardly for supporting such other end of the rotatory drive body while inhibiting motion of such other end of the rotatory drive body in a direction downwardly when the transport conveyor is mounted on the support framework; and
    a pair of third support units provided in correspondence with the opposite ends of the rotatory driven body and opening in a direction towards the rotatory drive body, said third support units supporting the opposite ends of the rotatory driven body while inhibiting motion of the opposite ends of the rotatory driven body in a direction upwardly and downwardly when the transport conveyor is mounted on the support framework.

6. The product sorter as claimed in claim 5, further comprising a rotary connecting shaft disposed coaxially with the rotatory drive body at a location outside one end of the rotatory drive body and arranged to be driven by the drive source, and a coupling for releaseably connecting the rotary connecting shaft and one end of the rotatory drive body for axial movement, but non-rotatably relative to each other, and wherein the first support unit includes a bushing for axially separably retaining the coupling.

7. The product sorter as claimed in claim 5, wherein the third support unit includes a second receiving groove opening towards the rotatory drive body for supporting an engagement projection, provided in the conveyor frame, while inhibiting the engagement projection from being shifted in a direction upwardly and downwardly, and wherein the support framework is formed with a guide surface inclined upwardly towards the rotatory drive body from the second receiving groove for guiding the engagement projection in a direction allowing it to be inserted into or separated from the second receiving groove when the transport conveyor is mounted on or removed from the support framework, respectively.

8. The product sorter as claimed in claim 5, wherein the support framework includes a first side plate positioned on one side of any of the rotatory drive and driven bodies having the first support unit and one of the third support units, and a second side plate positioned on the other side of any of the rotatory drive and driven bodies having the second support unit and the other of the third units, said actuator being connected with the second side plate.

9. The product sorter as claimed in claim 8, wherein the first and second support units and of the support framework cooperate with each other to allow the transport conveyor to be supported by the support framework with the axis of rotation of the support framework aligned with the axis of rotation of the rotatory drive body, and wherein the actuator is connected with the rotary shaft fitted to the second support unit and having the axis of rotation.

10. The product sorter as claimed in claim 9, further comprising an end member supported by the conveyor frame for rotatably supporting the other end of the rotatory drive body, and wherein the second support unit includes a first receiving groove opening upwardly for receiving an engagement stud of the end member from above to thereby inhibit the engagement stud from being shifted in a direction forwardly and rearwardly and also in a direction downwardly.

11. An apparatus comprising:
    a transport conveyor; and
    a support framework on which the transport conveyor is mountable thereon to thereby be supported by the support framework so that, when the transport conveyor is supported by the support framework, articles are conveyed by the transport conveyor and the support framework is pivotal up and down to divert the conveyed articles to different positions,
    wherein the transport conveyor includes a conveyor frame, a rotatory drive body mounted on one of opposite ends of the conveyor frame and having an axis of rotation, a rotatory driven body mounted on the other of the opposite ends of the conveyor frame and having an axis of rotation, and a transport belt around the rotatory drive body and the driven body, the transport conveyor being removable from the support framework when being supported by the support framework, the transport conveyor capable of being bent around a pivot axis when being mounted on or removed from the support framework, the pivot axis being displaced downwardly from an imaginary straight line connecting the axis of rotation of the rotatory drive body and the axis of rotation of the rotary driven body when the conveyor frame is not bent and supported in the support framework.

12. An apparatus comprising:
    a transport conveyor conveying articles; and
    a support framework supporting the transport conveyor in an unbended position while the transport conveyor conveys articles, the support framework being pivotal up and down to divert the conveyed articles to different positions, wherein
        the transport conveyor includes a conveyor frame, a rotatory drive body mounted on one of opposite ends of the conveyor frame and having an axis of rotation, a rotatory driven body mounted on the other of the opposite ends of the conveyor frame and having an axis of rotation, and a transport belt around the rotatory drive body and the driven body,
        the transport conveyor is removable from the support framework to thereby no longer be supported by the support framework, and
        the transport conveyor is bendable from the unbended position around a pivot axis when being removed from the support framework, the pivot axis being displaced downwardly from an imaginary straight line connecting the axis of rotation of the rotatory drive body and the axis of rotation of the rotary driven body when the conveyor frame is supported by the support framework in the unbended position.

13. An apparatus as in claim 12, wherein the imaginary line is parallel to a conveying direction of the transport conveyor.

14. An apparatus comprising:

a transport conveyor conveying articles; and a support framework supporting the transport conveyor in an unbended position while the transport conveyor conveys articles, the support framework being pivotal up and down to divert the conveyed articles to different positions, wherein the transport conveyor includes a conveyor frame, a rotatory drive body mounted on one of opposite ends of the conveyor frame and having an axis of rotation, and a rotatory driven body mounted on the other of the opposite ends of the conveyor frame and having an axis of rotation, the rotary drive body and the rotary driven body operate together to cause the articles to be conveyed, the transport conveyor is removable from the support framework to thereby no longer be supported by the support framework, and the transport conveyor is bendable from the unbended position around a pivot axis when being removed from the support framework, the pivot axis being displaced downwardly from an imaginary straight line connecting the axis of rotation of the rotatory drive body and the axis of rotation of the rotary driven body when the conveyor frame is supported by the support framework in the unbended position.

15. An apparatus as in claim 14, wherein the imaginary line is parallel to a conveying direction of the transport conveyor.

16. An apparatus comprising:

a transport conveyor conveying articles in a conveying direction; and a support framework supporting the transport conveyor in an unbended position while the transport conveyor conveys articles, the support framework being pivotal up and down to divert the conveyed articles to different positions, wherein the transport conveyor includes a conveyor frame, a rotatory drive body mounted on one of opposite ends of the conveyor frame and having an axis of rotation, and a rotatory driven body mounted on the other of the opposite ends of the conveyor frame and having an axis of rotation, the rotary drive body and the rotary driven body operate together to drive a conveyor belt and thereby cause the articles to be conveyed by the transport conveyor, the rotary drive body and the rotary driven body are positioned so that an imaginary straight line parallel to the conveying direction connects the axis of rotation of the rotatory drive body and the axis of rotation of the rotary driven body when the conveyor frame is supported by the support framework in the unbended position, the transport conveyor is removable from the support framework to thereby no longer be supported by the support framework, and the transport conveyor is bendable from the unbended position around a pivot axis when being removed from the support framework, the pivot axis being displaced downwardly from the imaginary straight line when the conveyor frame is supported by the support framework in the unbended position.

\* \* \* \* \*

UNITED STATES PATENT AND TRADEMARK OFFICE
CERTIFICATE OF CORRECTION

PATENT NO. : 6,708,813 B2
DATED : March 23, 2004
INVENTOR(S) : Atsushi Takahashi It is certified that error appears in the above-identified patent and that said Letters Patent is hereby corrected as shown below:

Column 7,
Line 32, change "21cincluded" to -- 21c included --.

Column 13,
Line 11, after "plates" delete "-".

Signed and Sealed this

Twenty-fifth Day of May, 2004

JON W. DUDAS
*Acting Director of the United States Patent and Trademark Office*